June 9, 1925. 1,541,268
F. K. LANDGRAF
TOOL
Filed Jan. 24, 1921
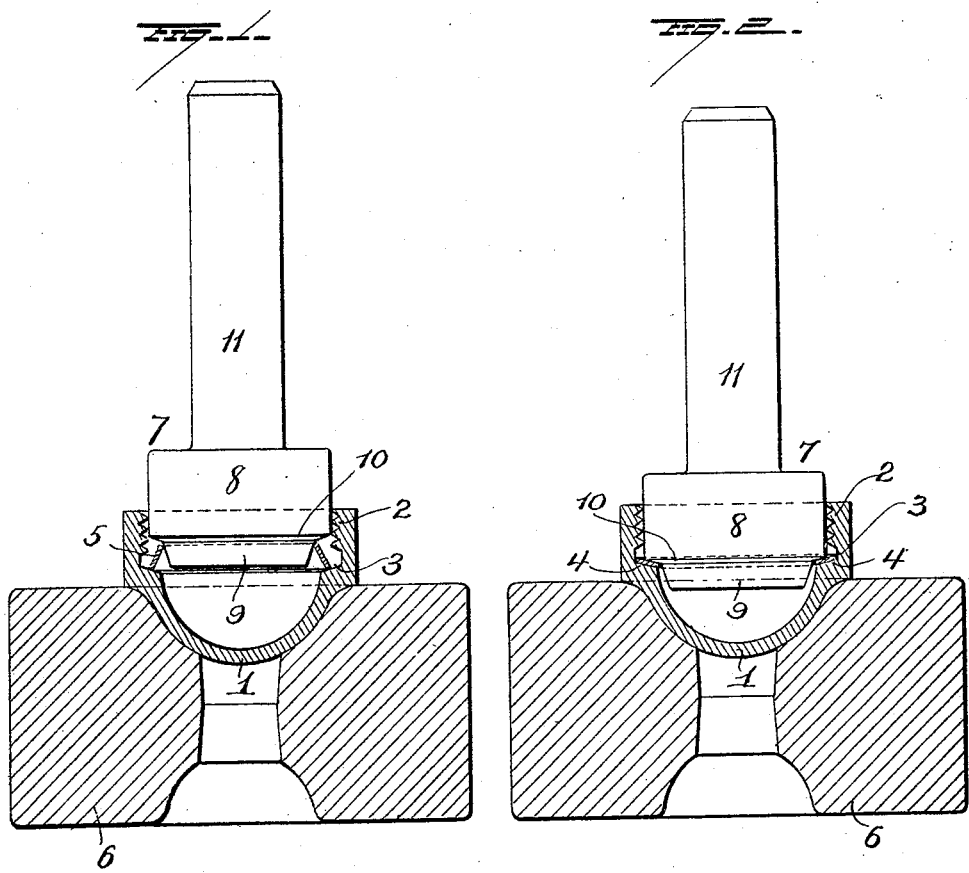

Patented June 9, 1925.

1,541,268

UNITED STATES PATENT OFFICE.

FREDERICK K. LANDGRAF, OF PITTSBURGH, PENNSYLVANIA, ASSIGNOR, BY MESNE ASSIGNMENTS, TO FLANNERY BOLT COMPANY, OF PITTSBURGH, PENNSYLVANIA, A CORPORATION OF DELAWARE.

TOOL.

Application filed January 24, 1921. Serial No. 439,507.

*To all whom it may concern:*

Be it known that I, FREDERICK K. LANDGRAF, a citizen of the United States, and a resident of Pittsburgh, in the county of Allegheny and State of Pennsylvania, have invented certain new and useful Improvements in Tools; and I do hereby declare the following to be a full, clear, and exact description of the invention, such as will enable others skilled in the art to which it appertains to make and use the same.

This invention relates to improvements in tools and more particularly to such as may be employed for facilitating the application of gaskets in hollow parts.

In the installation of stay bolts in steam boiler constructions, it is the practice to employ what is commonly known as "flexible" stay bolt structures. In some instances, these comprise a bolt having a rounded head mounted in a bearing sleeve which passes through or is secured to the boiler sheet and this bearing sleeve is provided with a cap or closure over the bolt head, said cap or closure being threaded to the bearing sleeve. In order that a steam tight joint shall be effected between the sleeve and threaded closure, a gasket is employed and it is important that this gasket shall fully cover the shoulder on which it rests and extend radially beyond the plane of the free edge of the screw-threads within the part in which the gasket is located, thus not only causing the gasket to completely cover the shoulder but also preventing escape of said gasket.

The object of my present invention is to provide a simple and efficient tool to facilitate the application of a gasket in the manner above mentioned.

With this and other objects in view, the invention consists in certain novel features of construction as hereinafter set forth and pointed out in the claims.

In the accompanying drawings; Figures 1 and 2 are sectional views, with the tool shown in elevation, illustrating the application of my invention.

In the drawings, I have illustrated the manner of using the tool in applying a metal gasket within a cap or closure for a bearing sleeve employed in staybolt structures for boilers.

1 represents a cap or closure having an internally threaded portion 2 to engage a threaded portion of a bearing sleeve, and inwardly beyond the threaded portion 2, an annular shoulder 3 is formed within the cap to receive a gasket 4. In the present instance, the gasket is made from a metal blank 5 which is tapering or in the shape of a cross-sectional portion of a hollow cone. Such gasket blank may readily be dropped into the cap or closure 1 without conflict with the threads therein and permitted to rest upon the annular shoulder 3. The cap or closure may be mounted in inverted position, in a recess in a support 6, with the gasket blank resting on the shoulder 3. The gasket will then be flattened or expanded, with the use of a tool 7 and caused to lie flatly against and cover the shoulder 3,— the gasket being made to project radially beyond the plane of the free edge of the screw-threads in the cap or closure.

The tool 7 includes a cylindrical head 8 having a tapering portion 9 which passes through the gasket blank, and between the body portion of the head and the tapering portion 8, a beveled shoulder 10 is formed. The tool also includes a shank 11 which constitutes a handle and also convenient means to permit hammering or pressing force to be applied to the tool.

With the tool in the position shown in Figure 1, the operator will apply force to the tool by hammering or otherwise and thus cause the shouldered head of the tool to flatten and expand the gasket blank on the annular shoulder 3 so that the gasket 4 will be disposed as above explained, the tapering portion 9 of the tool serving to insure the retention of the gasket blank centered during the expanding of the latter to position on the annular shoulder 3.

Having fully described my invention what I claim as new and desire to secure by Letters-Patent, is:—

A tool for applying gaskets within hollow members having internal annular shoulders, comprising a body portion adapted to enter into the hollow member, said body having a tapering extension and an annular flattening shoulder at the juncture of said extension with said body portion, said shoulder providing a surface adapted to engage a gasket within the hollow member and press it flatly against the shoulder in the latter.

In testimony whereof, I have signed this specification in the presence of two subscribing witnesses.

FREDERICK K. LANDGRAF.

Witnesses:
H. M. SCHADEL,
R. B. RETZER.